United States Patent
Leigh et al.

(10) Patent No.: US 7,793,089 B2
(45) Date of Patent: Sep. 7, 2010

(54) CONFIGURABLE BACKPLANE CONNECTIVITY FOR AN ELECTRICAL DEVICE

(75) Inventors: Kevin B. Leigh, Houston, TX (US); Michael L. Sabotta, Houston, TX (US); Albert H. Chang, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 881 days.

(21) Appl. No.: 11/669,839

(22) Filed: Jan. 31, 2007

(65) Prior Publication Data
US 2008/0183906 A1 Jul. 31, 2008

(51) Int. Cl.
*G06F 3/00* (2006.01)
*G06F 9/00* (2006.01)
*G06F 13/00* (2006.01)
*G06F 13/20* (2006.01)
*G06F 15/177* (2006.01)
*H05K 7/10* (2006.01)

(52) U.S. Cl. ............................... 713/1; 713/100; 710/8; 710/104; 710/301; 710/302; 710/313; 710/316

(58) Field of Classification Search ............ 713/1, 713/2, 100; 710/305, 8, 104, 301, 302, 313, 710/316; 439/59, 61, 62, 65; 361/788; 211/41.17
See application file for complete search history.

(56) References Cited

U.S. PATENT DOCUMENTS

| | | | |
|---|---|---|---|
| 6,081,530 A * | 6/2000 | Wiher et al. | 370/395.53 |
| 6,154,449 A * | 11/2000 | Rhodes et al. | 370/254 |
| 6,611,526 B1 * | 8/2003 | Chinnaswamy et al. | 370/406 |
| 6,754,757 B1 * | 6/2004 | Lewis | 710/301 |
| 7,363,417 B1 * | 4/2008 | Ngai | 710/316 |
| 7,370,132 B1 * | 5/2008 | Huang et al. | 710/307 |
| 7,496,742 B2 * | 2/2009 | Khatri et al. | 713/1 |
| 2005/0088445 A1 * | 4/2005 | Gonzalez et al. | 345/502 |
| 2005/0102454 A1 * | 5/2005 | McAfee et al. | 710/107 |
| 2005/0235070 A1 * | 10/2005 | Young et al. | 710/8 |
| 2005/0240703 A1 * | 10/2005 | Nguyen et al. | 710/301 |
| 2007/0011383 A1 * | 1/2007 | Berke et al. | 710/301 |
| 2007/0276981 A1 * | 11/2007 | Atherton et al. | 710/307 |

* cited by examiner

*Primary Examiner*—Mark Connolly (57) ABSTRACT

A method comprises obtaining connectivity information from a plurality of electrical devices. Each such electrical device is separately coupled to a backplane, and at least one electrical device comprises a plurality of electrical interfaces adapted to be selectively coupled to each of multiple other electrical devices. Based on connectivity information from the at least one electrical device, the method further comprises providing configuration information to the at least one electrical device to cause the at least one electrical device to electrically couple to a target other electrical device via the backplane.

18 Claims, 10 Drawing Sheets

CONFIGURABLE BACKPLANE CONNECTIVITY FOR AN ELECTRICAL DEVICE

BACKGROUND

In many systems, computers, input/output devices, storage devices, switches, etc. couple to each other across a backplane. Such devices install into slots in a cabinet in which the backplane is mounted. When installed in a slot, each device mates to a connector on the backplane. Because electrical connectivity between the various devices is implemented by the backplane, the backplane is designed to predict how users will install the various devices, which devices will be installed, etc.

Preferences as to the configuration of the system can be user-specific. For example, some users may prefer more storage devices than other users. The backplane design may, at least in part, dictate in which slots the user can install certain devices (e.g., servers, switches, storage devices, etc.). Any given backplane design may be acceptable to some users, but no doubt will not be acceptable to all users.

BRIEF DESCRIPTION OF THE DRAWINGS

For a detailed description of exemplary embodiments of the invention, reference will now be made to the accompanying drawings in which.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to. . . . " Also, the term "couple" or "couples" is intended to mean either an indirect, direct, optical or wireless electrical connection. Thus, if a first device couples to a second device, that connection may be through a direct electrical connection, through an indirect electrical connection via other devices and connections, through an optical electrical connection, or through a wireless electrical connection.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
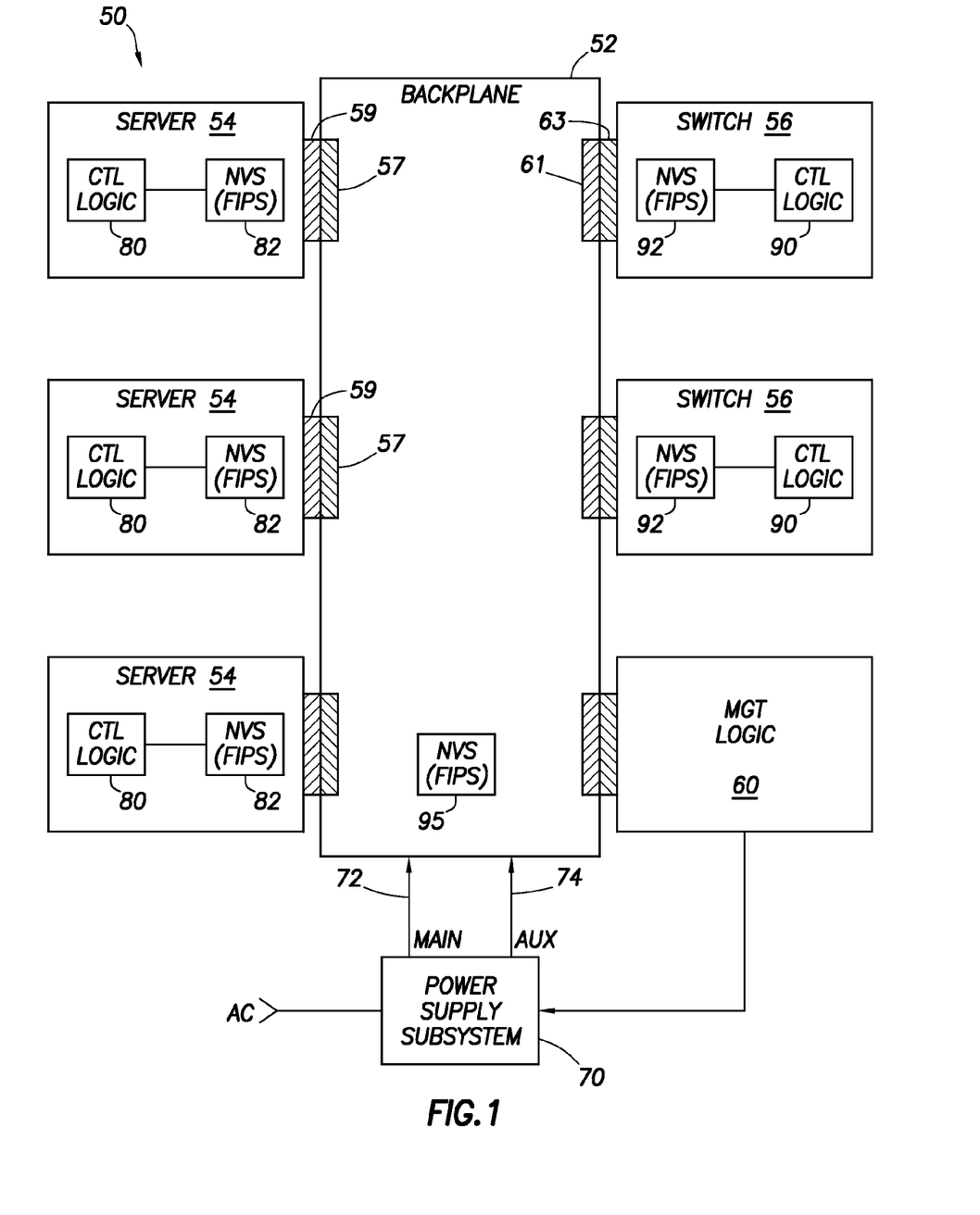
FIG. 1 shows a system in accordance with various embodiments.

FIG. 1 illustrates an embodiment of a system 50 comprising a backplane 52 to which multiple electrical devices 54 and 56 and management logic 60 can be coupled. The term "electrical device" comprises any device, piece of equipment, etc. that couples to the backplane 52 and, through the backplane, electrically couples to at least one other device also coupled to the backplane. In the illustrative embodiment of FIG. 1, electrical devices 54 comprise computers (e.g., servers) and electrical devices 56 comprise switches, although the electrical devices 54, 56 can be devices other than servers and switches.

Each server 54 comprises a connector 59 that mates to a corresponding connector 57 provided on the backplane 52. Similarly, each switch 56 comprises a connector 63 that mates to a corresponding connector 61 provided on the backplane 52. In some embodiments, each server 54 is provided in "blade" form and slides into a slot in an equipment rack in which the backplane 52 is mounted. The server's connector 59 blind-mates to the backplane's connector 57. The switches 56 also blind-mate to the backplane in a similar fashion.

The backplane 52 comprises a printed circuit board (PCB) that comprises multiple conductive traces that enable the various electrical devices (servers 54 and switches 56) to be communicatively coupled together in a desired arrangement. For example, various of the servers 54 may be coupled to a switch 56 through the backplane 52, while other servers couple to a different switch.

Referring still to FIG. 1, system 50 also comprises a power supply subsystem 70. The power supply subsystem 70 comprises one or more power supplies that receive alternating current (AC) voltage (e.g., 110 VAC) and provides one or more direct current (DC) voltage levels to the various electrical devices 54, 56. As such, each electrical device 54, 56 need not contain its own power supply, thereby permitting each electrical device 54, 56 to be smaller than would otherwise be the case. The power supply subsystem 70 can selectively provide power to each of the electrical devices 54, 56, or to selective groups of electrical devices. The power supply subsystem 70 thus provides a centralized power distribution subsystem for the system 50.

The power supply subsystem 70 of FIG. 1 provides at least two separately controlled output supply voltages 72, 74 through the backplane and to the electrical devices 54, 56. The supply 72 is labeled "main" and the supply 74 is labeled "auxiliary." The main supply 72 provides the main power to turn on, boot up, and operate the electrical devices 54, 56 and is at least partially under the control of the management logic 60. The management logic 60 provides a signal to the power supply subsystem 70 to direct the power supply subsystem to turn on the main supply 72 to the select electrical devices 54, 56. The main supply 72 may comprise multiple individual voltage supply feeds to various subsets of electrical devices. The management logic 60 can thus cause the power supply subsystem 70 to turn on various subsets of electrical devices 54, 56.

In at least some embodiments, even if the main supply 72 is off, the power supply subsystem 70 provides auxiliary supply 74 to a subset of the components within each electrical device 54, 56 as long as the AC power is provided to the power supply subsystem 70. That is, in at least some embodiments the auxiliary supply 74 is always on. The auxiliary supply 74, however, is not provided to all of the electrical components (e.g., processors, memory, etc.) within a server or switch and thus generally is not usable to fully power on and boot up the server or switch.

In some embodiments, the main supply 72 is provided to all devices 54, 56, etc., and each device generates its own auxiliary voltage from the main supply. In such embodiments, the main supply 72 is always on, as long as the power supply subsystem 70 is on, and provided to each device. Each device in this embodiment is selectively permitted to boot up via a signal from the management logic 60. Further, the auxiliary supply for each device is generated internally to each device and, in some embodiments, is always active even if the device is otherwise not initialized.

Each server 54 shown in FIG. 1 comprises control logic 80 coupled to a non-volatile storage (NVS) device 82. Each switch 56 also comprises a control logic 90 coupled to a NVS device 92. The backplane 52 comprises a NVS device 95 as well. Through the backplane 52, the management logic 60 couples to and can access the information stored on the NVS devices 82, 92, and 95. In accordance with various embodiments, the management logic 60 and NVS devices 82, 92, and 95 receive the auxiliary supply voltage 74 and thus are active and readable even when the electrical devices 54, 56 are otherwise off and thus not booted up.

While one or more or all of the electrical devices 54, 56 are in a "pre-boot" environment, the management logic 60 obtains information from the various NVS devices 82, 92, and 95, determines compatibility among various of the electrical devices coupled to the backplane 52, and configures the various electrical devices. A pre-boot environment of an electrical device is an environment of the device before the device has been booted. The electrical devices, in the illustrative embodiments, receive auxiliary supply voltage 74, at least for the NVS devices 82, 92 which thereby permits the NVS's contents to be read while the electrical device is in a pre-boot environment. The information stored on the NVS devices 82, 92 comprises information such as the device type, the configuration and the channel characteristics of the electrical device. The device type information can be read by the management logic 60 and used by the management logic, as explained below, to determine compatibility between electrical devices 54, 56. NVS device 95 comprises trace routing information of the backplane 52 that specifies which connectors on the backplane 52 are connected together. Alternatively, the management logic 60 contains pre-coded routing information for the back plane 52, or multiple back planes, and in the case of multiple back planes simply needs to know which back plane is present in the system (such information can be obtained from NVS 95.) From this routing information, the management logic 60 can determine which electrical devices 54, 56 would be coupled together upon boot up. If certain electrical devices, which would otherwise be electrically coupled to one another via backplane 52, are determined to be incompatible with each other, the management logic 60 programs certain configuration values into the NVS devices of such electrical devices that preclude the devices from electrically coupling to each other once powered on by the application of the main supply voltage 72. For example, a port on an electrical device 54 coupled to the backplane 52 may be disabled thereby preventing electrical connectivity to/from that device's port.

Aside from ensuring proper compatibility and preventing incompatible devices from coupling to each other, the management logic 60 also determines and provides configuration parameters to one or more of the electrical devices 54, 56 for other purposes. Such configuration parameters comprise, for example, a hardware "alias" for a server to replace that server's medium access control (MAC) address, characteristics regarding the nature of the communication channels between devices 54, 56, a boot target device's address, a port enable/disable value, and combinations thereof. Different or additional configuration parameters can be provided as well.

If a pair of electrical devices 54, 56 are determined not to be compatible with each other and would otherwise be coupled together via the backplane 52, a port disable value (e.g., bit) is written to at least one of, or both, of the incompatible electrical devices to disable their ports. In this way, two incompatible electrical devices are not permitted to be electrically connected to one another via a backplane that otherwise enable such devices to be connected to one another. If, on the other hand, the devices are compatible, then a port enable bit is set to permit the ports to be enabled and thus the devices to be connected together. In some embodiments, a port is disabled by default, unless a port enable bit is specifically set, that is, a port disable bit need not be set by the management logic 60.

The hardware alias is provided to the electrical device and is used by the electrical device to replace, for example, a MAC address. Such MAC addresses are programmed into the electrical device at the factory, but are replaced in some embodiments with a hardware alias value provided to the electrical device by the management logic 60. Replacing the MAC address with a hardware alias permits fast and easy reconfiguring of the system (e.g., the switches) as a server 54 is moved from one location in an equipment rack to another. More information as to the use of such a hardware alias can be as provided in accordance with, for example, the N-port Identifier Virtualization (NPIV) standard.

Each electrical device 54, 56 contains one or more components (e.g., Ethernet network interface controller (NIC) device and Fibre Channel Host Bus Adapter) capable of booting the electrical device. Each such component that can boot the electrical device has access to boot code (i.e., executable code that causes that component to boot the electrical device). One of the pieces of programmable configuration contained in the electrical device is the address of the boot code for a given component. Thus, the management logic 60 can program a boot target network address (e.g., IP address for an iSCI system Area Network (SAN) target, World-Wide Name for a Fibre Channel Target) for a given electrical device.

Figure 2:
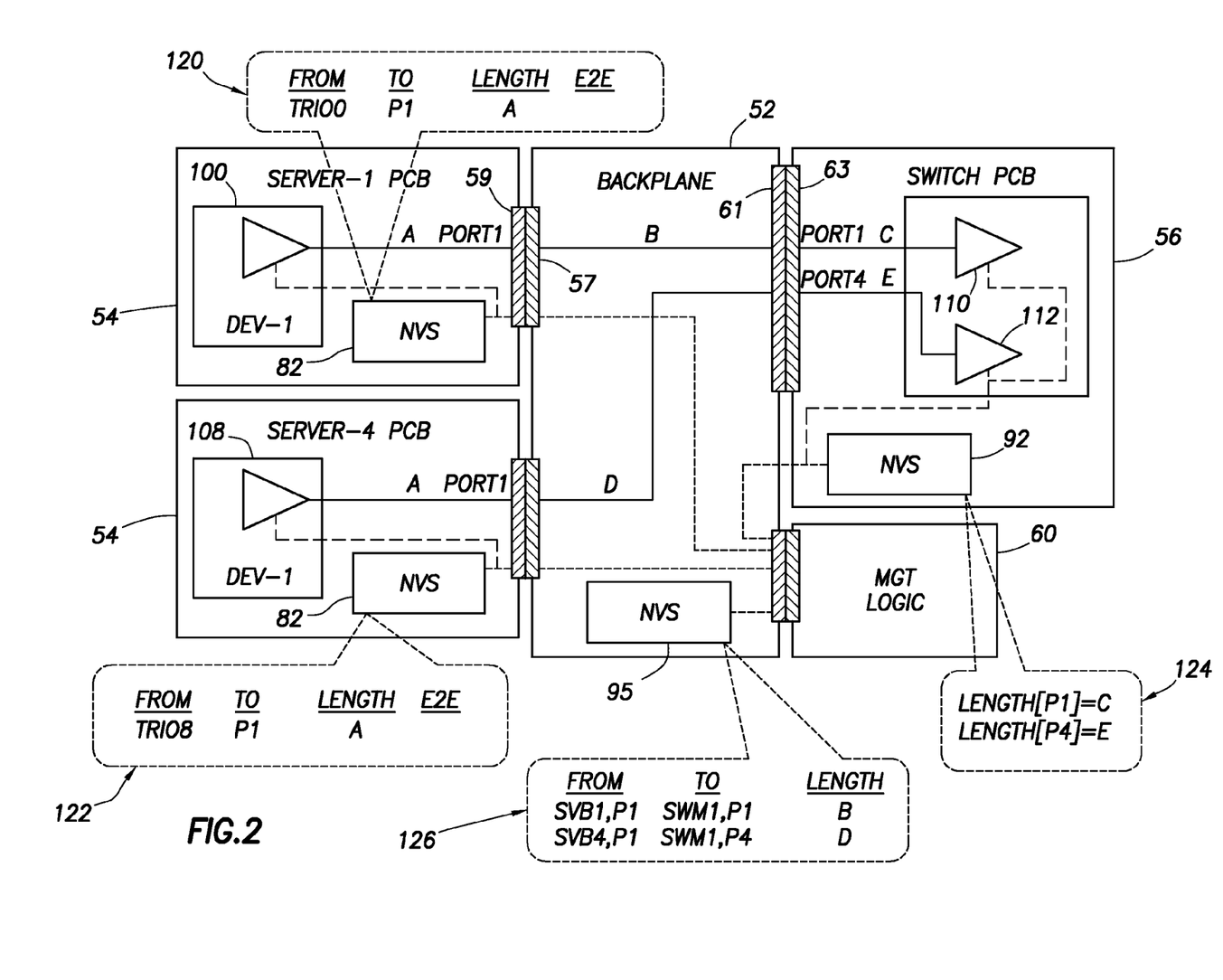
FIG. 2 illustrates multiple servers coupled to a switch via a backplane in accordance with various embodiments.
Figure 3:
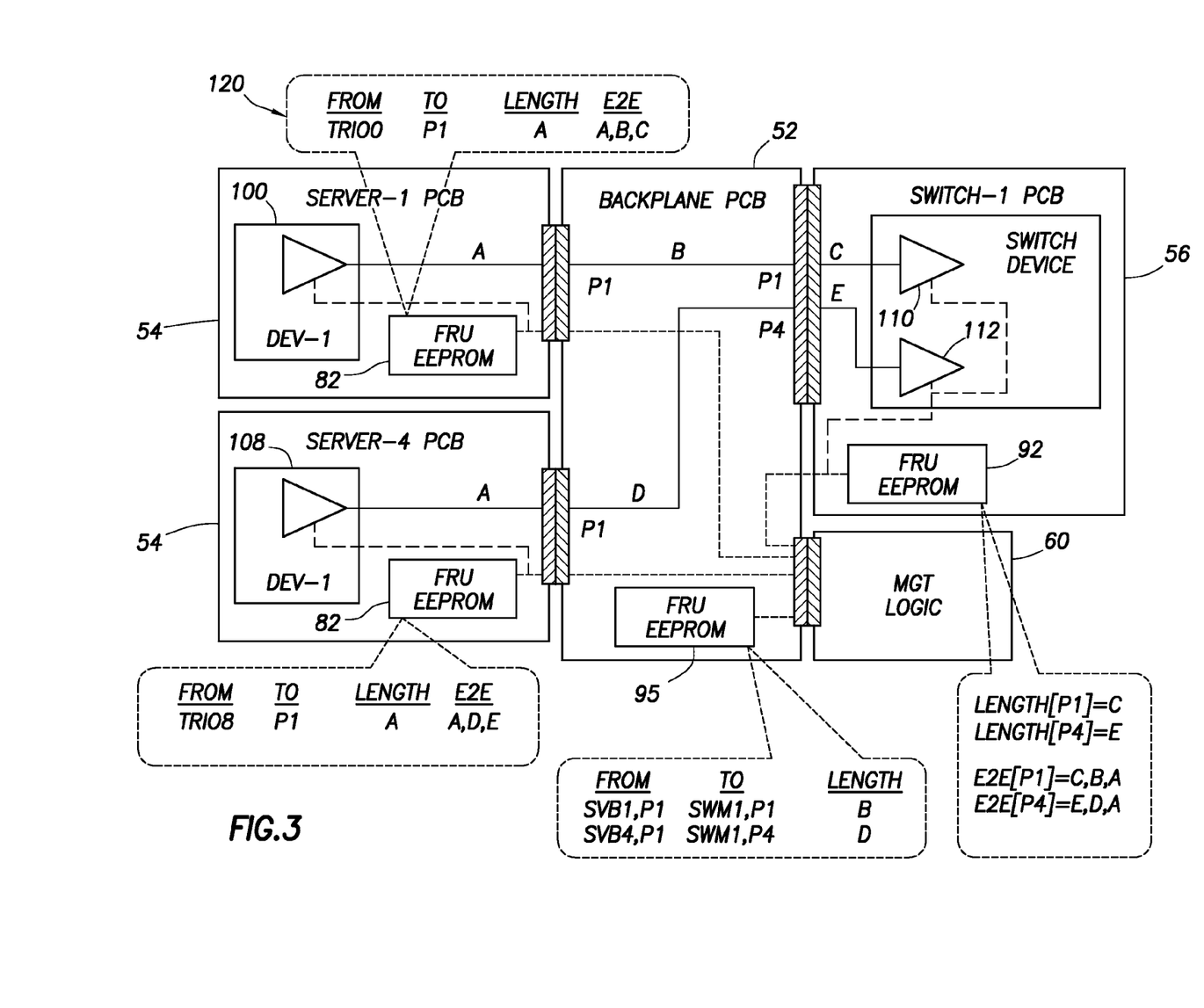
FIG. 3 illustrates multiple servers coupled to a switch via a backplane and the determination of end-to-end channel characteristics in accordance with various embodiments.
Figure 4:
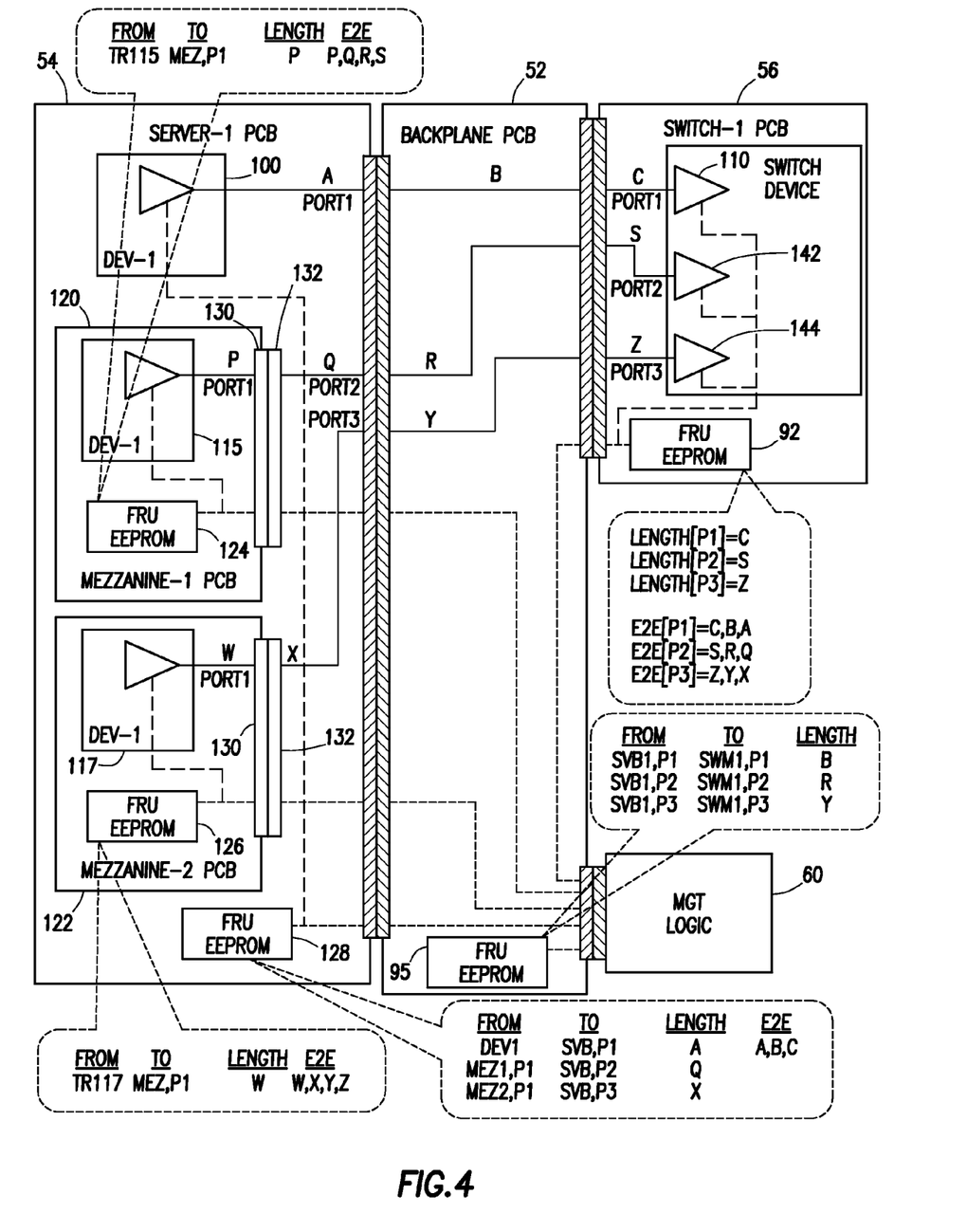
FIG. 4 illustrates a server having multiple mezzanine cards coupled to a switch via a backplane in accordance with various embodiments.

As noted above, another configuration parameter type comprises channel characteristics, that is, the characteristics of the communication channels between electrical devices via the backplane 52. The channel characteristics are used to configure the transmitters and/or receivers for improved signal integrity. An example of a channel characteristic is the length of the conductive traces from a transmitter on one electrical device to a receiver on a receiving electrical device. FIGS. 2-4 illustrate the use of such channel characteristic parameters. In FIG. 2, two servers 54 are shown coupled through backplane 52 to a switch 56. The servers 54 are labeled as Server-1 and Server-2. Each server 54 comprises a PCB on which some or all of the server's electronic components are mounted. In some embodiments, a server's PCB is referred to as a "system" or "mother" board. FIG. 2 illustrates that the NVS device 82 is mounted on the PCB of each server 54. Also shown is an illustrative transmitter mounted on each server's PCB. As shown, the Server-1 and Server-4 PCBs include transmitters 100 and 108, respectively. In at least some embodiments, each signal line from the server 54 on which a signal is transmitted includes a transmitter. Each transmitter drives the signal. The signals are routed from the server PCB, to the connectors 59, 57, through the backplane 52, and through connectors 61, 63 to the switch's PCB.

In the example of FIG. 2, transmitters 100 and 108 both transmit signal to the same switch 56. The switch 56 comprises a receiver for each of the corresponding transmitters. Switch 56 thus comprises a receiver 110 that receives signals driven by transmitter 100, as well as a receiver 112 that receives signals driven by transmitter 108.

The distances traveled by the signals from their transmitters 100, 108 to the corresponding receivers 110, 112 are illustrated in FIG. 2 by the letter designations A, B, C, D, and E. As shown, the signal from transmitter 100 to receiver 110 travels a distance A from the transmitter 100 to the connectors 59, 57, then a distance B across the backplane 52 to the other pair of connectors 61, 63, and finally a distance C across the switch's PCB to the receiver 110. The total distance traveled is thus approximately A+B+C. In a similar fashion, signals from transmitter 108 travel a distance of A to connectors 59, 57, then a distance D across the backplane 52 to the other pair of connectors 61, 63, and finally a distance E across the switch's PCB to the receiver 112—a total distance of A+D+E.

Each electrical device 54, 56 has one or more ports. The servers 54 are shown in FIG. 2 having the ports labeled as "port 1," while switch 56 has two ports labeled as "port 1" and "port 4." Each NVS device 82, 92, 95 is programmed with information that is indicative of the distances across the relevant PCB from point to point that a signal travels. For example, the NVS device 82 of Server-1 includes the distance A (or a representative value for A) indicating the distance from transmitter 100 to the server's port 1. This information is designated by reference numeral 120. Similarly, the NVS device 82 of Server-4 includes the distance A indicating the distance from transmitter 108 to port 1 (reference numeral 122). In the example of FIG. 2, the distance from each of the transmitters 100, 108 to the connectors 59 is thus approximately the same. The NVS device 92 of the switch 56 illustrated in FIG. 2 includes two distances C and E to indicate the distances from ports 1 and 4 of the switch to each of the receivers 110, 112, respectively (reference numeral 124). Further still, the backplane's NVS device 95 stores distances B and D indicating the distances across the backplane for each of the two signal lines depicted in the example of FIG. 2 (reference numeral 126).

The values A, B, etc. programmed into the various NVS devices are programmed at the factory during manufacturing of the various electrical devices 54, 56 and backplane 52. What is not known at the time of manufacturing of the individual electrical devices 54, 56, and backplane 52 is the total end-to-end ("E2E") distances from transmitter to receiver. The E2E distances are not known until the various electrical devices 54, 56 are installed in the rack and connected to the backplane 52.

The management logic 60 reads the distance values from the various NVS devices 82, 92, and 95 and determines channel characteristics based on such values. In at least some embodiments, the management logic reads the distance values and determines the channel characteristics automatically (i.e., without user involvement). The channel characteristics are used to program the various transmitters 100, 108 and/or receivers 110, 112. In at least some embodiments, the channel characteristics comprise the various lengths of the individual segments comprising the conductive pathways between pairs of transmitters and receivers. Once the management logic 60 determines the lengths of the constituent conductive pathway segments, the management logic 60 provides the length values to each electrical device for storage in the respective NVS devices. FIG. 3, for example, illustrates that the lengths A, B and C have been stored by the management logic 60 in the NVS device 82 of Server-1, and the lengths A, D and E have been stored in the NVS device 82 of Server-4.

In other embodiments, the channel characteristics are computed by adding together the various lengths that comprise conductive pathways from transmitters to receivers, and programming the total distances into the respective NVS devices. In the example of FIG. 2, the total conductive pathway length from transmitter 100 to receiver 110 is A+B+C, while the total conductive pathway length from transmitter 108 to receiver 112 is A+D+E. In yet other embodiments, the channel characteristics comprise insertion and reflection losses of various channel segments.

The channel characteristic that is determined for each electrical device 54, 56 is used by that device to configure the transmitters in accordance with at least some embodiments. The configuration of the transmitters comprises configuring such parameters as the transmitter output voltage level, the amount of pre-emphasis, amount of de-emphasis, and combinations thereof. Pre-emphasis is a technique by which the leading portions of a voltage waveform are configured to have larger voltage swings than the trailing portions for the consecutive same-value bits. De-emphasis is a technique by which trailing portions of a voltage waveform have smaller swings than the leading portions for the consecutive same-value bits. The difference between pre-emphasis and de-emphasis is whether the leading portions have higher swings than the normal level (pre-emphasis) or whether the trailing portions have smaller swings than the normal level. Making the leading edges "stronger" permits the signal to retain higher frequency components as it travels through "lossy" channels. The programmability of a transmitter depends on the particular transmitter being used and the programmability that that transmitter affords.

During the pre-boot environment for one or more of the electrical devices, the management logic 60 determines the channel characteristics and stores such characteristics in the NVS devices 82 and 92. Subsequently, during the boot process of each electrical device 54, 56, the respective control logic 80, 90 configures the transmitters based on the channel characteristics programmed into the NVS devices 82, 92 by the management logic 60 in the pre-boot environment.

Instead of, or in addition to, configuring the transmitters as described above, the receivers can be configured in a similar manner if desired.

FIG. 4 illustrates a system in which server 54 comprises two "mezzanine" cards 120 and 122. Each mezzanine card 120, 122 comprises a PCB and mates to the server's PCB. A mezzanine card is an option card that is mounted to the server's motherboard and can be interchanged with a variety of other option cards. Further, each mezzanine card 120, 122 comprises one or more transmitters 115, 117 and a NVS device 124 and 126 as shown. Each mezzanine card comprises logic that performs a desired function. The mezzanine cards 120, 122 contain connectors 130 which mate to corresponding connectors 132 on the server's PCB. Each mezzanine card comprises a port (labeled as port "port 1"). The server 54 comprises three ports, labeled as port 1, port 2, and port 3. Port 1 of mezzanine card 120 couples to port 2 on the server, while port 1 of mezzanine card 122 couples to port 3 on the server. Server ports 1-3 couple across the backplane 52 to switch module ports 1, 2 and 3, respectively.

The signals from the transmitters 115, 117 travel across the mezzanine card, the server's PCB, the backplane PCB, and the switch's PCB to the corresponding receivers 110, 142, and 144. Thus, transmitter 100, which is mounted on the server's PCB transmits a signal which travels a distance A to port 1 on the server 54, then a distance B across the backplane 52 from the server's port 1 and the switch module port 1 and finally a distance C to the receiver 110, for a total distance of A+B+C. A signal from transmitter 115 on mezzanine card 120 travels a distance P to port 1 on the mezzanine card (at its connector 130), then a distance Q to port 2 of the server, then a distance R across the backplane between server port 2 and the switch module port 2, and finally a distance S to the receiver 142, for a total distance of P+Q+R+S. A signal from transmitter 117 on mezzanine card 122 travels a distance W to port 1 on the mezzanine card (at its connector 130), then a distance X to port 3 of the server, then a distance Y across the backplane 52, and finally a distance Z to the receiver 144, for a total distance of W+X+Y+Z.

Mezzanine cards 120 and 122 includes NVS devices 124 and 126, respectively, mounted on their respective PCBs. The server 54 also includes a NVS device 128 mounted on the server's PCB. Similarly, the backplane 52 and switch module 56 also comprise NVS devices 95 and 92, respectively. Each NVS device 124, 126, 128, 95 and 92 is programmed at the factory with the distances (or at least values representative of the distances) from the transmitters to the connectors on the associated PCBs. Thus, NVS device 124 is programmed with the distance P representing the distance from the transmitter 115 to port 1 of mezzanine card 120. Similarly, the NVS device 126 of mezzanine card 122 is programmed with the distance W representing the distance from the transmitter 117 to port 1 of mezzanine card 122. The backplane's NVS device 95 is programmed with the distances B, R and Y representing the distances between server ports 1-3 and corresponding switch module ports 1-3. The switch module's NVS device 92 is programmed with the distances C, S, and Z representing the distances from the switch module port's 1-3 and the various transmitters 110, 142 and 144.

As described above, the management logic 60 reads the distance values from each of the NVS devices and computes whatever channel characteristic is suitable for use in configuring the various transmitters and/or receivers. In some embodiments, the computed channel characteristic may comprise a list of the distances between connectors (e.g., A, B, C for the channel between transmitter 100 and receiver 110) or the total distance between transmitter and receiver (e.g., A+B+C for the channel between transmitter 100 and receiver 110).

Figure 5:
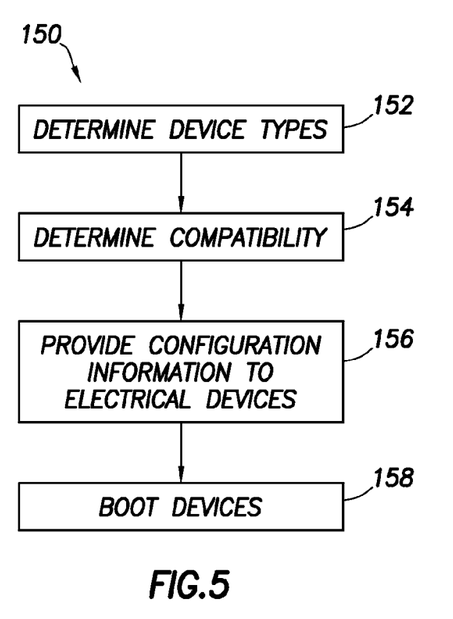
FIG. 5 illustrates a method of determining electrical device compatibility and configuring the electrical devices in accordance with various embodiments.

FIG. 5 shows an illustrative method 150 in accordance with at least some embodiments. In accordance with method 150, the management logic 60 determines the types of electrical devices 54, 56 coupled together via the backplane 52 (action 152). At 154 of method 150, the management logic determines whether electrical devices 54, 56, that would otherwise be electrically coupled together via the backplane 52, are compatible. One example of incompatibility is a transmitter of one electrical device being coupled to a transmitter of another electrical device, rather than to a receiver. At 156, management logic 60 provides configuration information to each of the various electrical devices in the NVS devices. The configuration information comprises, for example, a port enable/disable request. Such a request sets a bit that dictates whether a port of the electrical device is to be enabled if the electrical device is compatible with another electrical device connected to it via the backplane 52 or disabled if the electrical devices are incompatible. Other types of configuration information are discussed above. At 158, each of the electrical devices is caused to boot up. During the boot process of each electrical device, in some embodiments, the configuration information previously stored in that electrical device's NVS device by the management logic 60 is accessed and used by control logic in the electrical device to configure the electrical device.

Figure 6:
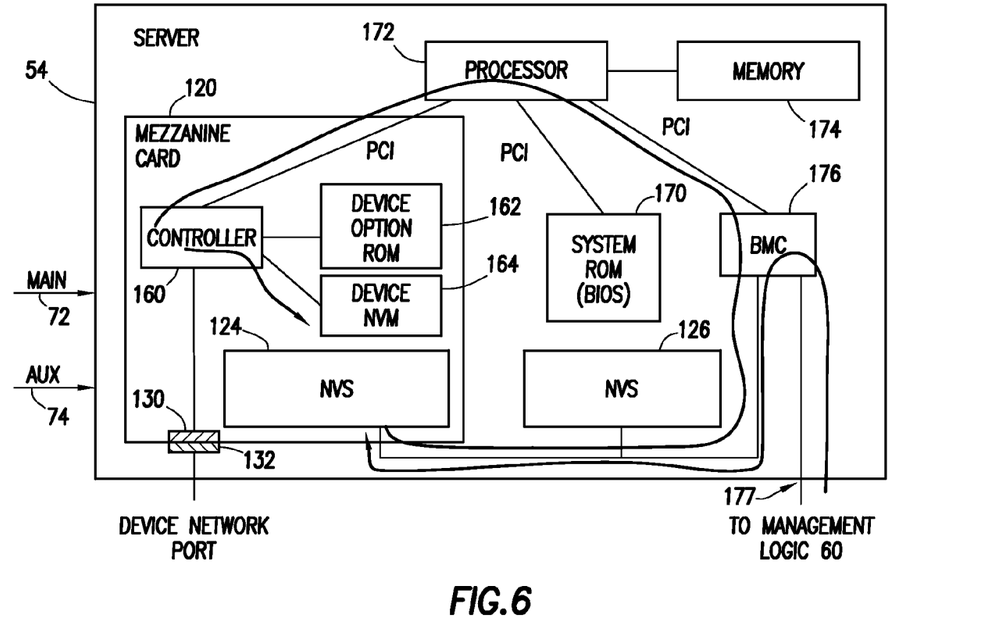
FIG. 6 is a block diagram of an electrical device in accordance with various embodiments.

FIG. 6 shows an illustrative embodiment of an electrical device 54. The electrical device shown in FIG. 6 comprises, for example, a server but the architecture of FIG. 6 is applicable to other types of electrical devices as well. The server 54 shown in FIG. 6 comprises a processor 172, memory 174, a baseband management controller (BMC) 176, a system read only memory (ROM) 170 as well as a mezzanine card 120 and a NVS device 126. The mezzanine card 120 comprises a controller 160, a device option ROM 162, device non-volatile memory 164, and NVS device 124. The system ROM 170 contains a pre-boot execution environment such as a unified extensible firmware interface (UEFI) or a basic input/output system (BIOS) which comprise code executable by processor 172.

The server 54 receives the main supply voltage 72 (when the server is to be powered on) and the auxiliary supply voltage 74. As noted above, the auxiliary supply voltage 74, in at least some embodiments, is always on, even if the main supply 72 is off, as long as the power supply subsystem 70 receives AC input power. In some embodiments, the auxiliary supply voltage 74 is provided to the NVS devices 124, 126 and the BMC 176. Thus, the NVS devices 124, 126 and the BMC 176 are operational even if the server 54 is otherwise powered off and/or in a non-operational state. Any or all components in the electrical device that receive main supply voltage and not the auxiliary supply voltage comprise the electrical device's control logic (FIG. 1), which is also referred to as "core" logic.

The BMC 176 provides a management port 177 which can couple to the management logic 60 via the backplane 52. The BMC 176 can also read data from and/or write data to the NVS devices 124 and 126. As such, when the management logic 60 reads the server's configuration information, the management logic 60 submits a read request across the backplane 52 to the desired server 54. The read request is received by the server's BMC 176 which, in turn, reads the NVS device 124, 126. The information so read by the BMC 176 is then provided back to the management logic 60. The same interaction also occurs between the management logic 60 and the other electrical devices such as the switch(es).

Figure 7:
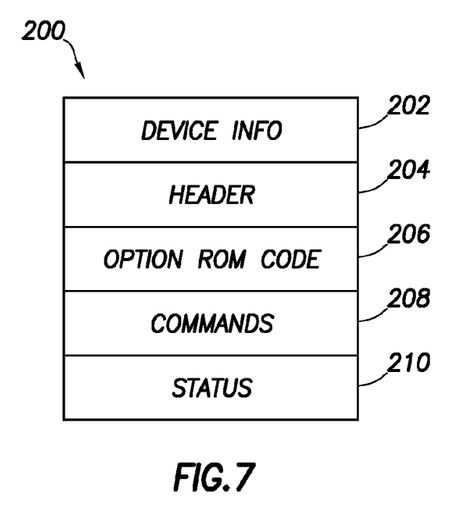
FIG. 7 illustrates an embodiment of a fabric interface parameter (FIP) dataset.

The information stored in the NVS devices is referred to as "fabric interface parameters" (FIPs). An illustrative embodiment of a FIP data set stored in a NVS device is shown in FIG. 7 as FIPs 200. The FIPs 200 shown in FIG. 7 comprises device information 202, header 204, option ROM code 206, commands 208, and status 210. In some embodiments all of the portions 202-210 shown in FIG. 7 are provided in the FIPs, while in other embodiments, fewer than all of the constituent portions, or different information, are provided.

In some embodiments, the device information 202 is provided in accordance with, for example, the Intelligent Platform Management Interface (IPMI) protocol. The IPMI protocol defines a format for manufacturer's information. The IPMI data fits within 512 bytes of storage and provides such information as product information which specifies the type of electrical device (e.g., server), channel characteristic information, and chassis information. Other or different information may be included as well. The device information 202 is used by the management logic 60 to determine device type for assessing compatibility between the devices. In some embodiments, the management logic 60 is programmed with device types that are known to be incompatible. In other embodiments, the management logic 60 is programmed with pairs (or more) of device types that are known to be compatible. In such embodiments, all other device type pairs are deemed by the management logic 60 to be incompatible by default.

As noted above, the device information 202 also comprises channel characteristic information. The channel characteristic information may comprise the length information, explained previously, defining the distances between the transmitters and the ports on the relevant devices. For example, the device information 202 of the mezzanine card's FIPs (stored in NVS device 124) contains the distances between, for example, the transmitters in the controller 160 and the mezzanine card's connector to the server's PCB. The device information 202 of the server's PCB (stored in NVS device 126) contains the distances between, for example, server's connector 132 (which receives signals from the mezzanine card 120) and server's port that mates to the backplane 52.

Referring still to FIG. 7, the header information 204 comprises offsets to the beginning of each of the option ROM code 206 and the command and status areas 208 and 210. The option ROM code 206 comprises code that is executable by, for example the processor 172 and will be described below. The command area 208 comprises one or more commands received from the management logic 60 that are performed by the server 54 to configure the server. At least some, or all, commands will result in a status message indicating the status of the command after being performed. For each command 208 that has a status message, the corresponding status message will subsequently be stored in the status area 210 by the system ROM 170 via the processor 172 and the BMC 176.

When the management logic 60 requests the BMC 176 to provide the device type, the BMC 176 accesses the FIPs information stored in the NVS devices provided in the server 54. In the example of FIG. 6, the server 54 comprises two NVS devices 124 and 126. The NVS device 124 is provided on the mezzanine card 120 and the NVS device 126 is provided on the server's PCB (e.g., system board). The FIPs contained in the NVS device 124 comprises FIPs information related to the mezzanine card in which the NVS device 124 is located, while the FIPs contained in the NVS device 126 comprises FIPs information related to the server's PCB or devices on the server's PCB. As explained above, the FIPs information stored in NVS devices 124, 126 in part collectively define the distances involved for signals to traverse from each source transmitter (provided in controller 160) to the server's external port. The NVS device 126 also provides information that defines the type of server from which the management logic 60 can determine inter-device compatibility. The NVS device 124 provides device type information regarding the mezzanine card itself and such information may be used by the management logic 60 as well in determining compatibility.

After reading the FIPs information from each electrical device (e.g., server 54) and determining compatibility, the management logic 60 generates configuration parameters to provide to each such electrical device. In accordance with various embodiments, the management logic 60 provides the configuration parameters in the form of commands and provides such commands to each electrical device to be stored in the FIPs command area 208. Each configuration command 208 contains a configuration parameter. Multiple configuration commands, and thus multiple configuration parameters, can be provided in the command area 208 of one FIPs data set 200. In at least some embodiments, an electrical device can receive and store multiple (e.g., 8) FIPs data sets 200. Upon receiving a FIPs data set 200 from the management logic 60, the BMC 176 stores the FIPs data set 200 in the NVS device 124, 126 associated with that particular FIPs. In at least some embodiments, each FIPs data set 200 is assigned by, for example, the management logic 60 or the respective electrical device, a FIPs identification number (FIN) that uniquely distinguishes one FIPs data set from another. Each electrical device is pre-programmed with an association between FINs and the NVS devices in which each such FIPs is to be stored. The logic in the electrical device that receives each FIPs data set 200 from the management logic 60 examines the FIN contained therein and stores the received FIPs data set in a NVS device that has previously been assigned to that particular FIPs data set. The ROM code for each electrical device comprises details regarding that device's layout (e.g., how the embedded components and the mezzanine cards are connected). Thus, the ROM code contains information as to how to associate a FIP's data set with a set of components, for example, on a mezzanine card. In some embodiments, a Peripheral Bus Interconnect (PCI) addressing scheme is used. Such a PCI addressing scheme uses bus number, device number, and function number. An ascending FIN is associated with the function number.

The commands 208 are provided in accordance with any suitable format. In at least one embodiment, the mezzanine card 120 comports with the peripheral component interconnect (PCI) protocol. Further, the electrical device implements the PCI Firmware 3.0 (PCIFW3) protocol for transferring information between the BIOS 170 and the devices option ROM 162 on the mezzanine card 120.

The management logic 60 reads the FIPs information from the various NVS devices in the system, determines compatibility among the relevant electrical devices 54 and 56, and provides configuration parameters to the various electrical devices in accordance with, for example, the compatibility determination and channel characteristics involved across the various PCBs. The management logic 60 performs these actions while the various electrical devices 54, 56 are in a pre-boot environment.

Once an electrical device 54, 56 receives the main supply voltage 72, the electrical device begins its boot process. The boot process for an electrical device 54, 56 comprises various actions at least one of which is configuring the device. The configuration of the device comprises configuring the device using the various configuration parameters provided to the device by the management logic 60 during the pre-boot environment.

Figure 8:
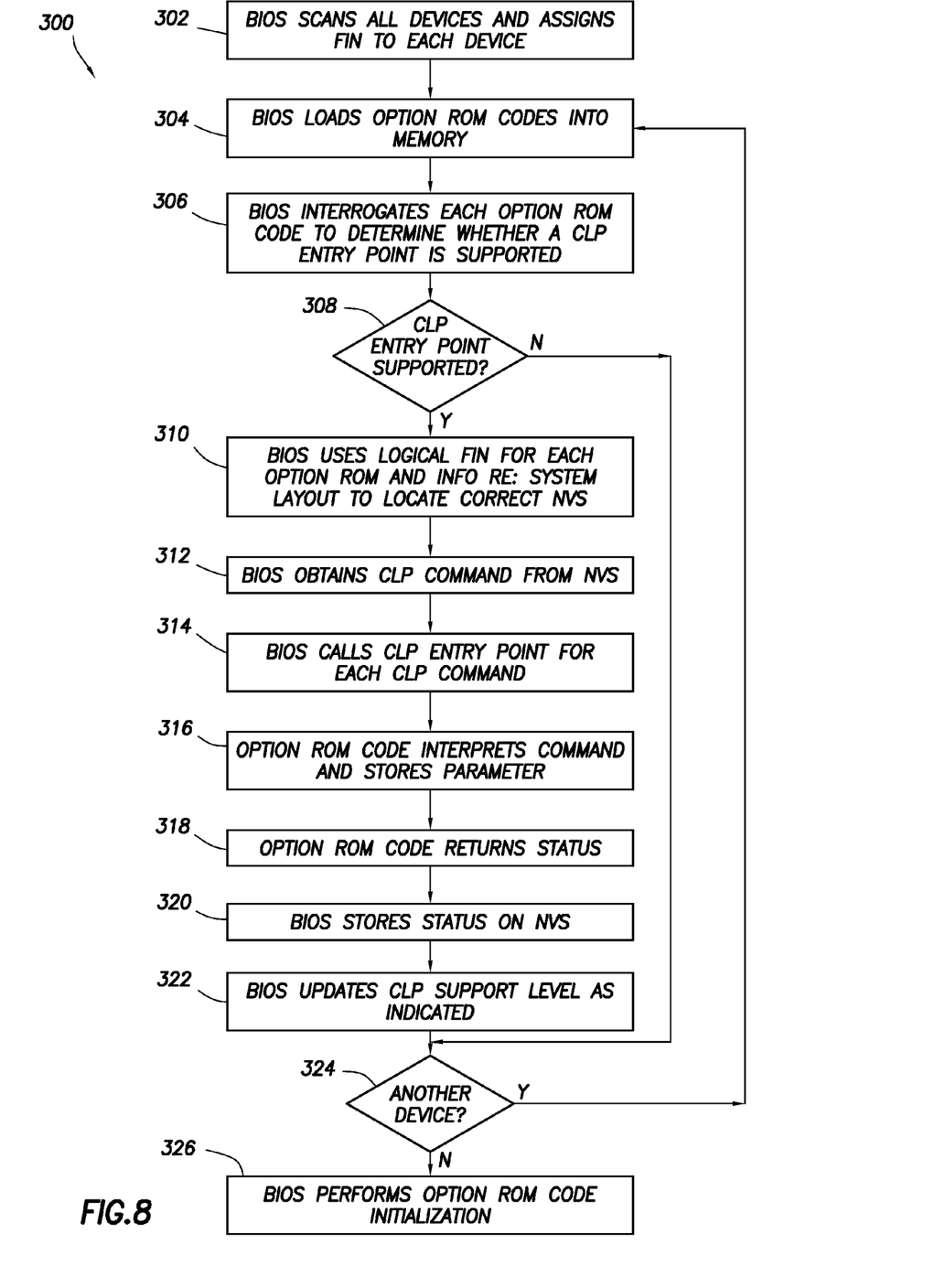
FIG. 8 illustrates a method of configuring an electrical device using FIP data.

FIG. 8 shows an illustrative method embodiment 300 for an electrical device (e.g., a server) to configure itself using the management logic-provided configuration parameters. At 302, the BIOS code scans all scannable components within the server and assigns FIPs identification numbers (FINs) to each device found during the scan. At 304, the BIOS loads each option ROM code 162 present into the memory 174. At 306, the BIOS interrogates each such option ROM code 162 to determine whether the code supports a command line protocol (CLP) entry point in accordance with the PCFW3 protocol. If a CLP entry point is not supported by the option ROM code (as determined at decision 308), control passes to decision 324 in which the BIOS determines whether another option ROM code is present. If another option ROM code is present, control loops back to 304. If another option ROM code is not present, then control passes to block 326 in which the BIOS performs option ROM code initialization and otherwise continues with the boot process.

Referring back to decision 308, if a CLP entry point is supported, then at 310 the BIOS locates the FIN for each interface port (Port 1, etc.). At 312, the BIOS obtains the CLP string commands by, for example, requesting the BMC 176 to read the CLP commands from the relevant NVS's FIPs. At 314, the BIOS calls the CLP entry point for each CLP command and at 316, the option ROM code 162 interprets the command and stores the parameters in the device's non-volatile memory 164 or in registers. At 318, the option ROM code 162 returns the status string associated with the CLP string and the CLP support level of the option ROM code, and the BIOS at 320 sends the status string to the BMC 176 to store it in the FIPs in the NVS device 124. At 322, if the CLP support level of the option ROM code is different from the FIP's CLP support level, then the BIOS sends the new CLP support level of the option ROM code to the BMC 176 to store it in the NVS device 124. This updated CLP support level will be read by the management logic 60 in future transactions to determine the capability of the device. Control then passes to decision 324 (described above).

As explained above, each command 208 is performed using, for example, the option ROM code 162 of a relevant mezzanine card. Performing the command comprises, for example, loading the configuration information contained in that command into storage (e.g., device-non-volatile memory 164, registers, etc.) suitable for storing such configuration information. Once the configuration information is loaded into the appropriate location, the electrical device completes the configuration process. For example, if a configuration value is to disable a particular port in the electrical device due to detection by the management logic of an incompatibility problem, such a port is disabled. If the configuration information comprises end-to-end channel characteristics, such information is used to program the relevant transmitters and/ or receivers. Further still, the configuration information may comprise a hardware alias which is used to replace the factory-provided MAC address as explained previously.

The mezzanine card 120 comprises option ROM code that is used in the method 300 of FIG. 8 to configure the electronics on the mezzanine card in accordance with the configuration parameters provided by the management logic 60. The mezzanine card's option ROM code may be provided on the mezzanine card in ROM 162 apart from the NVS device that contains the FIPs. In some embodiments, however, a FIP dataset itself comprises the option ROM code as illustrated in FIG. 7 (option ROM code 206). This embodiment is useful in situation, for example, in which the mezzanine card does not have any option ROM code, such as a bus repeater dip.

Figure 9:
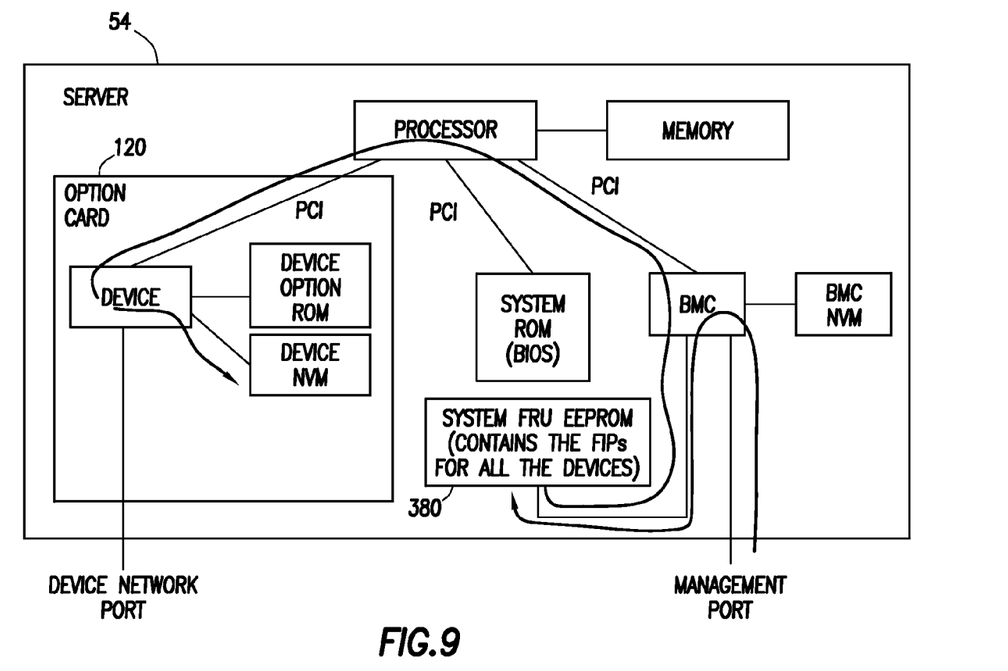
FIG. 9 is an alternative block diagram of an electrical device in accordance with various embodiments.

In at least some embodiments, the mezzanine cards may not comprise the NVS devices that contain the FIPs. Instead, as shown in FIG. 9, a NVS device 380 is provided on the server's PCB. The NVS device 380 comprises a centralized repository for FIPs for all devices within the server 54. For the embedded devices, the system ROM has most or all of the information of the system layout to associate the embedded fabric interface devices' ports with the FIPs by assigning the FINs. For the mezzanine cards, the electrical device (e.g., server) is powered on at least enough to discover the option devices that are present, obtain the device information from the PCI configuration space, and program the NVS 380 with the mezzanine cards' devices' information, and then power down the electrical device. The system BIOS obtains the mezzanine cards' information (FIPs) which may have been hard-coded into the mezzanine card, and provides the information to the BMC 176 which, in turn, stores the information in system NVS 380. Once stored in NVS 380, the method described herein are used to retrieve the mezzanine card's information from NVS 380, and provides the information to the management logic 60 for use as described herein. The FIN is a mechanism by which the FIPs dataset of, for example, a mezzanine card can be associated with the mezzanine card logic despite the FIPS dataset not be stored with the card.

This "boot-to-discover" step can be commanded by the management logic 60, where the associated BMC for each server can control the powering of the server at the lowest state and communicate with the BIOS to determine when to shut down the server after the NVS 380 is programmed with the mezzanine cards' devices' information.

Figure 10:
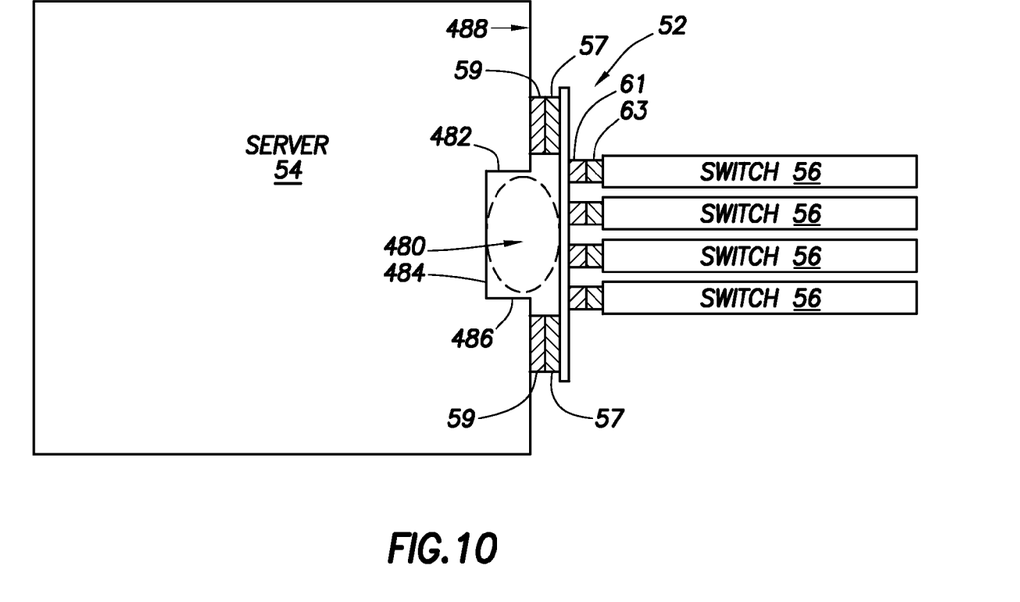
FIG. 10 shows a side view of electrical devices mated to a backplane in accordance with various embodiments.

FIG. 10 illustrates a side view of electrical devices 54 (e.g., server) and 56 (e.g., switches) mated to connectors on the backplane 52. The electrical device 54 shown in FIG. 3 comprises a pair of connectors 59 mated to corresponding connectors 57 provided on the primary backplane. In the example of FIG. 10, switches 56 mate to an opposing side of the backplane 52. Each switch 56 comprises a connector 63 that mates to a corresponding connector 61 provided on the backplane 52. As can be seen in the illustrative embodiment of FIG. 10, electrical devices 54 and 56 mate to opposing sides of the backplane 52.

In accordance with various embodiments and as further explained in U.S. patent application entitled "System Having Primary and Secondary Backplanes," Ser. No. 11/669,860 and incorporated herein by reference, electrical device 54 comprises a "cut-out" area 480. In the embodiment of FIG. 10, the cut-out area is defined by edges 482, 484, and 486, where edge 484 is orthogonal to edges 482 and 486 and parallel to the edge 488 of the electrical device 54. Thus, the illustrative cut-out area 480 in FIG. 10 is generally square or rectangular in shape. When the electrical device 54 is mated to the backplane 52, the cut-out area 480 corresponds to a surface region of the primary backplane which is generally devoid of any components that would interfere with the installation of another backplane.

Figure 11:
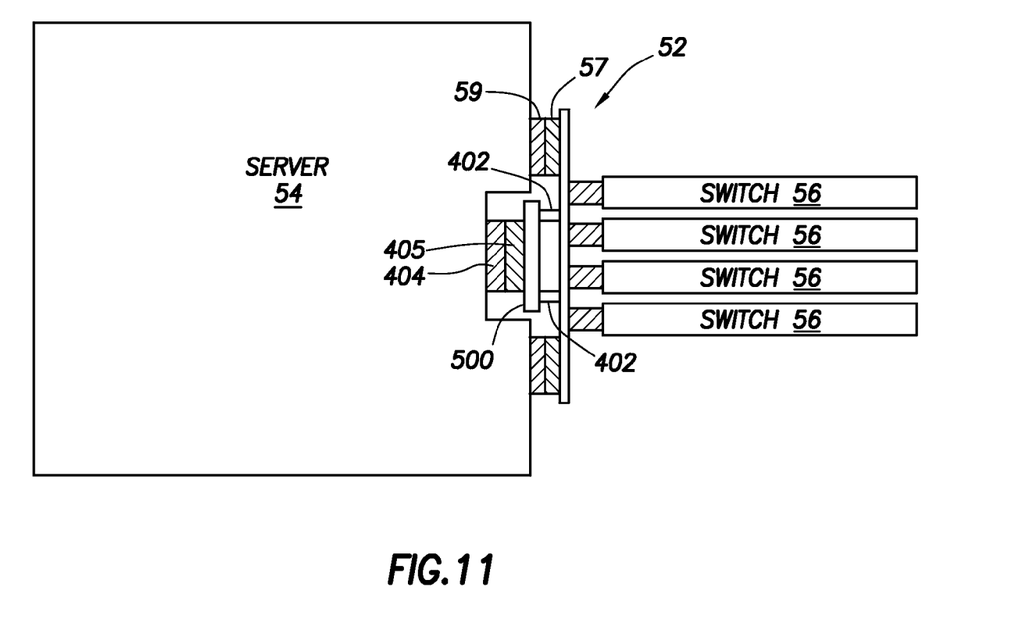
FIG. 11 shows a side view of electrical devices mated to primary and secondary two backplanes in accordance with various embodiments.

FIG. 11 illustrates a side view of the electrical device 54 mated to the backplane 52 and also to another backplane 500. Backplane 52 is referred to as a "primary" backplane and backplane 500 is referred to as a "secondary" backplane. The term "secondary," however, should not be construed to impart any functional limitations on the nature of the backplane 500. The term "secondary" is used merely to distinguish the backplanes 52 and 500 from each other.

The secondary backplane 500 of FIG. 11 comprises a PCB having two or more connectors that mate to corresponding connectors provided on the electrical device 54 in the cut-out area 480. FIG. 11 shows the secondary backplane having a connector 405 mated to a corresponding connector 404 provided on the electrical device 54. In accordance with at least some embodiments, the secondary backplane 500 mates to the primary backplane 52 via only a mechanical mechanism (e.g., standoffs 402). In some embodiments there is no electrical connectivity between the backplanes 52 and 500, although in other embodiments, electrical connectivity between backplanes may be provided.

In the example of FIG. 11, the electrical device 52 mates to two backplanes—primary backplane 52 and secondary backplane 500—via multiple connectors 59 and 404. In accordance with various embodiments, the primary backplane 52 functions to interconnect the switch modules 56 to the various electrical devices 54.

Figure 12:
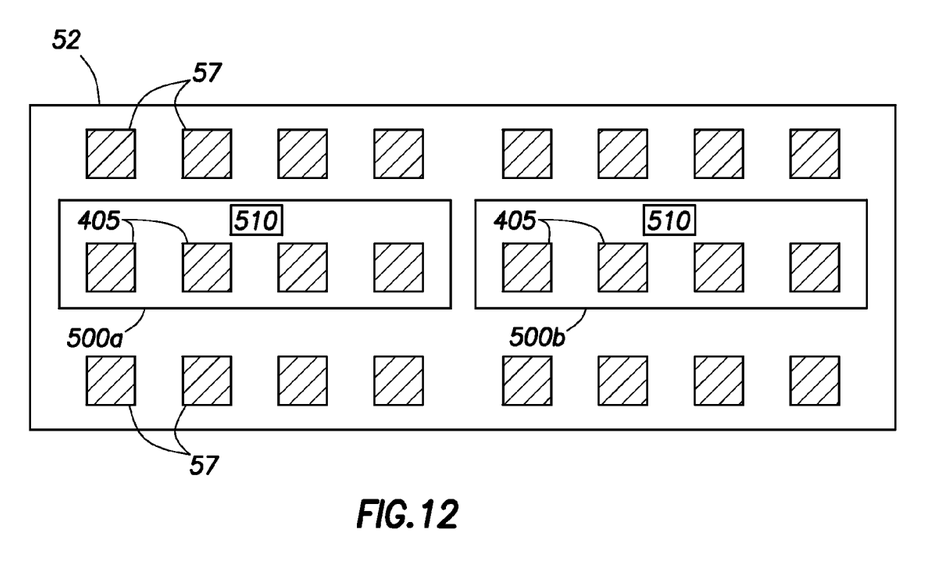
FIG. 12 illustrates an embodiment of secondary backplanes comprising non-volatile storage for storing FIPs data.

The secondary backplane 500 communicatively interconnects (e.g., electrical interconnection, optical interconnection) only those electrical devices 54 that connect to the secondary backplane 500. Each secondary backplane 500 can be constructed to interconnect any desired number of electrical devices 54. FIG. 12, for example, illustrates a pair of secondary backplanes 500a and 500b that each interconnect four electrical devices 54.

Referring still to FIG. 12, each such secondary backplane 500a, 500b can also be provided with a NVS device 510. NVS device 510 for each secondary backplane 500a, 500b provides information regarding that backplane's layout and channel characteristics as described above. Each NVS device 510 is connected to the management logic 60 via the primary back plane 52. Moreover, a system may have multiple backplanes with each backplane comprising one or more NVS devices that contain FIPs information and used to determine compatibility.

In accordance with various embodiments, the management logic 60 obtains connectivity information from one or more of the electrical devices connected to the backplane 52. The management logic 60 then causes the electrical devices to be electrically coupled to certain other electrical devices given the connectivity information, information regarding the layout of the backplane and user preferences.

Figure 13:
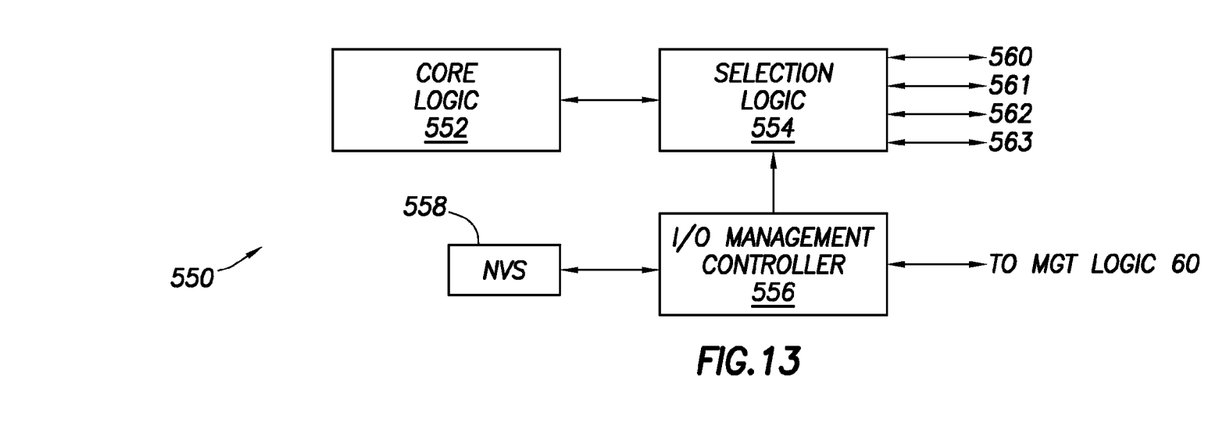
FIG. 13 illustrates an embodiment of an electrical device having multiple selectable interfaces.

FIG. 13 illustrates an embodiment of an electrical device 550 that can be coupled to the backplane 52. The electrical device 550 may comprise an input/output (I/O) device, a storage device, a computer, etc. As shown, electrical device 550 comprises core logic 552 coupled to selection logic 554. The selection logic 554 provides four electrical interfaces 560-563 to the backplane 52, although the number of electrical interfaces can be different than four. The selection logic 554 selects one of its output electrical interfaces (ports) 560-563 by enabling the target electrical interface and disabling all other of its electrical interfaces.

Figure 14:
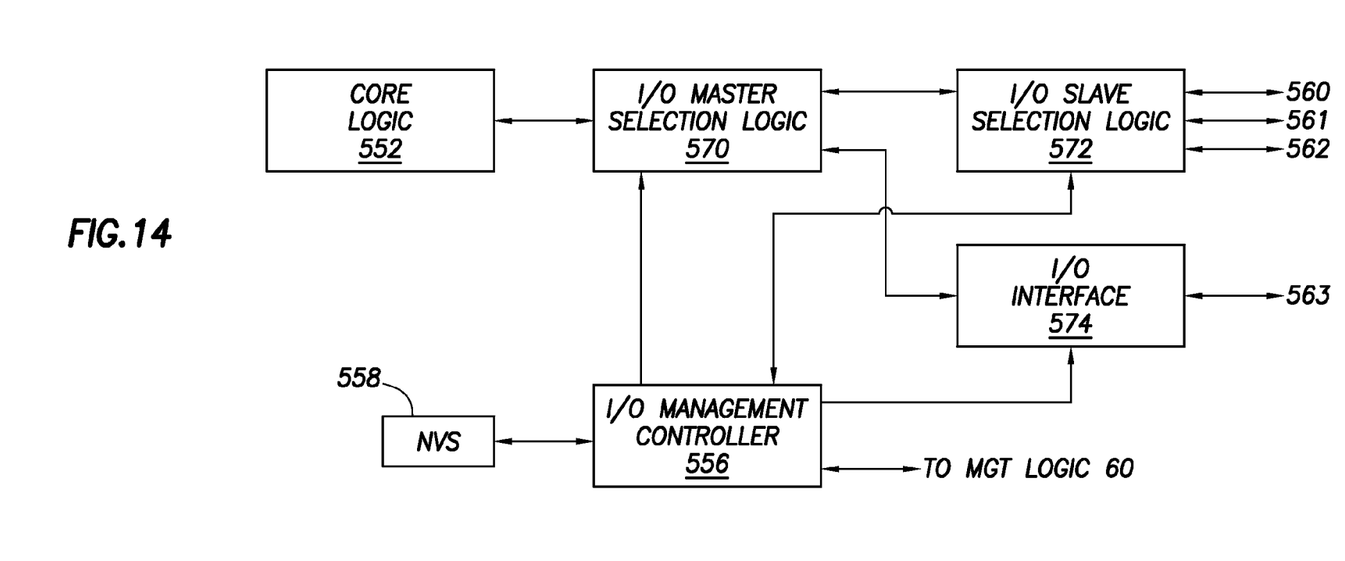
FIG. 14 illustrates an alternative embodiment to the electrical device of FIG. 13.

In some embodiments, only a single electrical interface is enabled, while in other embodiments two or more of the electrical interfaces can be enabled. For example, in an alternative embodiment as depicted in FIG. 14, the electrical device 550 comprises an I/O master selection logic 570, slave selection logic 572 and an I/O interface 574. The I/O master selection logic 570 couples between the core logic 552 and the slave selection logic 572 and the I/O interface 574. The slave logic 572 provides three electrical interfaces 560, 561, and 562 (although the number of interfaces can be varied from that shown) and the I/O interface provides a fourth electrical interface 563. The I/O management controller 556 provides control signals to the I/O master selection logic 570, slave selection logic 572 and I/O interface 574, and can configure the electrical device to enable at least one of the three interfaces 560-562 from the slave selection logic 572 as well as the interface from the I/O interface 574. For example, one of the interfaces 560-562 can be enabled concurrently with I/O interface 563.

The electrical device also comprises an I/O management controller 556 (e.g., a BMC) that provides an electrical interface across the backplane to the management logic 60. A NVS device 558 is also provided and is accessible to the I/O management controller 556. In at least some embodiments, the I/O management controller 556 and the NVS device 558 receive auxiliary power and thus are operational even if the electrical device 550 is otherwise off and in a pre-boot environment.

In at least some embodiments, the NVS device 558 is used as described above. Further, the NVS device 558 stores backplane connectivity information for the electrical device 550. Such backplane connectivity information specifies, for example, the number of electrical interfaces 560-563 provided by the selection logic 554 and connectivity between those interfaces and the pins of the connector(s) that mate the electrical device 550 to the backplane.

Figure 15:
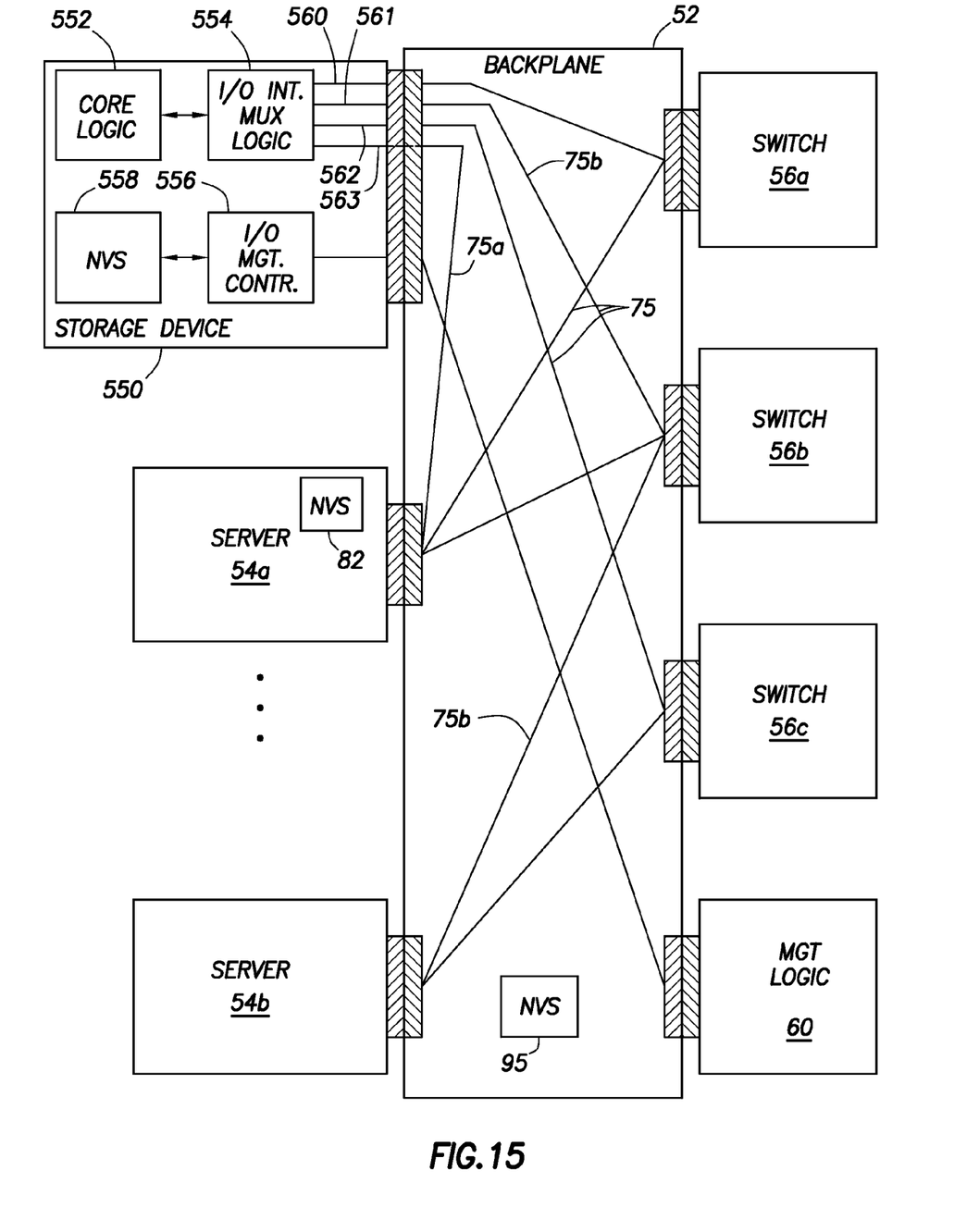
FIG. 15 exemplifies a system containing the electrical devices of either FIG. 13 or 14.

FIG. 15 illustrates an embodiment of the electrical device 550 connected to backplane 52. Servers 54a and 54b as well as switches 54a, 54b, and 54c also connect to the backplane 52. The backplane 52 comprises various conductive pathways 75 (e.g., traces) which connect certain backplane connectors to other backplane connectors. The specific inter-connector connectivity through the backplane 52 is different from one backplane design to another. As illustrated in the example of FIG. 14, electrical device 550 comprises a storage device on which data can be stored by one or more of the servers 54a, 54b. Such servers 54a, 54b electrically connect to the storage device in one of multiple ways. Server 54a couples to storage device 550 via a pathway 75a through the backplane 52 as shown. Server 54b couples to the storage 550 via switch 56b and conductive pathways 75b as shown. Thus, server 54a connects directly through the backplane 52 to storage device 550 while server 54b connects through switch 56b to the storage device. The NVS device 95 on the backplane 52 provides connectivity information regarding the backplane. For example, the NVS device 95 specifies that a direct electrical connection is present between the slots in which the storage device 550 and server 54a are installed (e.g., adjacent slots).

FIG. 15 shows some, but not necessarily all connections across the backplane 52 between slots in which servers, storage devices, switches, etc. are installed. Additional conductive pathways may be included as well so that any slot can accept any type of device (server, storage device, etc,) thereby providing the user with considerable flexibility as to the number of devices of each type to be installed as well as their location.

The management logic 60 determines which devices are connected to the backplane 52 as discussed above. This determination is made in some embodiments while the electrical devices 550, 54a, 54b, 56a, 56b, and 56c are in pre-boot environments. The management logic 60 obtains connectivity information from the NVS device 558 of the storage device 550 as well as the corresponding NVS devices of the other electrical devices. Based at least in part on the connectivity information provided by the storage device 550, the management logic 60 determines how the storage device 550 is to be electrically coupled to the one or more server to which that storage device 550.

For example, each of servers 54a and 54b may be configured to have access to the storage device 550. Upon reading the NVS device 95 on the backplane 52, the management logic 60 determines that storage device 550 can be connected directly to server 54a through the backplane's conductive pathway 75a. Further still, the management logic 60 determines that conductive pathways are not provided on the backplane to directly interconnect the storage device 550 and the server 54b. Accordingly, the management logic 60 provides configuration information to the storage device 550 which, when the storage device 550 initializes, causes the storage device to enable its electrical interface 563 for communicating via pathway 75a to server 54a and to enable electrical interface 561 for communicating via pathways 75b and switch 56b to server 54b.

Moreover, the management logic 60 obtains the connectivity information from the storage device 550 (e.g., from the I/O management controller 556 reading the NVS device 558) while the storage device is in a pre-boot environment. This action is part of actions 152 and/or 154 of the flowchart 150 of FIG. 5. The management logic 60 generates the configuration information noted above and provides (action 156 in FIG. 5) the configuration to the storage device 550 while the storage device 550 is still in the pre-boot environment. The management logic-provided configuration is stored by the I/O management controller 556 in the storage device's NVS device 558. Then, when the storage device 550 initializes (e.g., boots up) (action 158), the storage device 550, the previously stored configuration information is used to program the selection logic 554 to connect the storage device 550 to the backplane 52 as desired.

In some embodiments, a default setting is imposed by the management logic 60. For example, the management logic 60 may specify that only the interface 563 is enabled and interfaces 560, 561, and 562 are disabled. The default setting can be over-written by a user by sending one or more commands to the management logic 60 via, for example, a workstation (not shown) coupled to the management logic. In this manner, the user can specify preferences that identify, for example, resources to be used by the system.

In some embodiments, core logic 552 comprises one or more disk drives and the I/O interface 574 comprises a storage controller for server 54a to exclusively use the storage device 550. If server 54a and 54b are to interface to the storage device 550, then the switch 56b comprises a shared storage controller. The switches 56a and 56b may comprise redundant shared storage controllers. Each such shared storage controller comprises connectivity to the storage device 550 via pathways 75. The shared storage controller comprises logic to virtualize the storage device 550 to thereby allocate to the servers 54a and 54b one or more logical storage units. There can be a secondary set of default configurations of the logical units (e.g., equally sub-divide the storage capacity for the number of servers the management logic discovered across the backplane).

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method, comprising:
    obtaining connectivity information from a plurality of electrical devices, each such electrical device separately coupled to a backplane, and at least one electrical device comprises a plurality of electrical interfaces adapted to be selectively coupled to each of multiple other electrical devices; and
    based on connectivity information from said at least one electrical device, providing configuration information to said at least one electrical device to cause said at least one electrical device to electrically couple to a target other electrical device via the backplane;
    wherein obtaining connectivity information comprises obtaining information as to a plurality of selectable ports of said at least one electrical device.

2. The method of claim 1 wherein obtaining connectivity information also comprises obtaining information as to selection logic of said at least one electrical device.

3. The method of claim 1 wherein providing said configuration information to said at least one electrical device comprises providing said at least one electrical device with a command as to which of a plurality of ports to enable.

4. The method of claim 1 further comprising configuring said at least one electrical device to couple to a target other electrical device via said backplane using said configuration information.

5. The method of claim 1 wherein obtaining connectivity information comprises obtaining said connectivity information during a pre-boot environment.

6. The method of claim 1 wherein providing configuration information to said at least one electrical device comprises providing configuration information to said at least one electrical device during a pre-boot environment of said at least one electrical device.

7. A system, comprising:
    a backplane comprising a plurality of conductive pathways;
    a plurality of electrical devices, each separately coupled to the backplane, at least one electrical device comprising a plurality of electrical interfaces, each electrical interface configured to couple through the backplane to a different other electrical device; and
    management logic coupled to the backplane and configured to obtain connectivity information from at least one electrical device and, based on the connectivity information, to program said at least one electrical device to couple to a target other electrical device via said backplane;
    wherein said at least one electrical device comprises select logic providing said plurality of electrical interfaces.

8. The system of claim 7 wherein said management logic programs said at least one other electrical device also based on user preferences.

9. The system of claim 8 wherein said user preferences identify one or more resources to be used.

10. The system of claim 7 wherein said select logic selectively enables a specific electrical interface based on programming information from said management logic.

11. The system of claim 7 wherein said management logic is configured to program said at least one electrical device to couple through said backplane to an electrical device selected from a group consisting of a computer, a switch, a storage device, and an input/output device.

12. The system of claim 7 wherein said management logic obtains said connectivity information said at least one electrical device while said at least one electrical device is in a pre-boot environment.

13. The system of claim 7 wherein said management logic provides configuration information to said at least one electrical device while said at least one electrical device is in a pre-boot environment.

14. The system of claim 7 wherein, upon initialization, said at least one electrical device enables a port based on programming information provided by said management logic.

15. The system of claim 7 wherein said at least one electrical device comprises a device selected from an input/output device and a storage device.

16. A system, comprising:
   means for obtaining connectivity information from a plurality of electrical devices, each such electrical device separately coupled to a backplane, and at least one electrical device comprises a plurality of electrical interfaces adapted to be selectively coupled to each of multiple other electrical devices; and
   means for providing configuration information to said at least one electrical device to cause said at least one electrical device to electrically couple to a target other electrical device via the backplane wherein said means for obtaining connectivity information obtains information as to a plurality of selectable ports of said at least one electrical device.

17. The system of claim 16 further comprising means for generating said configuration based on said connectivity information.

18. The system of claim 16 further comprising means for receiving said configuration during a pre-boot environment.

* * * * *